(12) United States Patent
Kim et al.

(10) Patent No.: US 7,647,078 B2
(45) Date of Patent: Jan. 12, 2010

(54) POWER-SAVING METHOD FOR WIRELESS SENSOR NETWORK

(75) Inventors: Jae-Hoon Kim, Seoul (KR); Yong-Sung Roh, Icheon-si (KR); Ari Arapostathis, Austin, TX (US); Young-Sang Kim, Austin, TX (US); Young-Gon Choi, Suwon-si (KR)

(73) Assignees: Samsung Electronics Co., Ltd. (KR); Board of Regents, The University of Texas System, Austin, TX (US)

( * ) Notice: Subject to any disclaimer, the term of this patent is extended or adjusted under 35 U.S.C. 154(b) by 485 days.

(21) Appl. No.: 11/369,014

(22) Filed: Mar. 7, 2006

(65) Prior Publication Data

US 2007/0211654 A1    Sep. 13, 2007

(51) Int. Cl.
*H04M 1/00* (2006.01)

(52) U.S. Cl. ............... 455/574; 455/343.3; 455/127.1; 455/127.5

(58) Field of Classification Search ............... 455/574, 455/127.1, 127.5, 343.3
See application file for complete search history.

(56) References Cited

U.S. PATENT DOCUMENTS

2005/0043027 A1* 2/2005 Emeott et al. ............ 455/435.1

* cited by examiner

*Primary Examiner*—Patrick N. Edouard
*Assistant Examiner*—Shantell Heiber
(74) *Attorney, Agent, or Firm*—NSIP Law

(57) ABSTRACT

A power-saving method of wireless communication device, which operates a sleep mode for minimizing power consumption except for an active mode for communication, initializes a sleep probability upon the device being turned on, operates the active mode for communication with starting an active mode timer, transits to the sleep mode when there is no packet to transmit or receive before the active mode timer expires; and determines an exit from the sleep mode on the basis of the sleep probability.

19 Claims, 7 Drawing Sheets

POWER-SAVING METHOD FOR WIRELESS SENSOR NETWORK

BACKGROUND OF THE INVENTION

1. Field of the Invention

The present invention relates generally to a wireless sensor network and more particularly to a power saving method of sensor nodes of the wireless sensor network.

2. Description of the Related Art

Mainly due to the recent progress in wireless communications, Micro-Electro-Mechanical-Systems (MEMS) and microprocessor technology, the practical deployment of wireless sensor networks will soon become a reality. Such a network is envisioned as consisting of a large number of energy constrained devices, each of which is equipped with a radio transceiver, a small microprocessor and a number of sensing devices, and usually powered by a battery. These self-configurable nodes form a distributed network where the sensing information (generated by the scattered sensor nodes) is delivered to one or more sensing data collectors.

Because it is infeasible to replenish or recharge the battery of the sensor nodes, their operation is highly constrained by power so that the energy consumption of the nodes is the major operational constraint or concern. To relieve this constraint, many algorithms have been proposed for the lifetime of network itself to be extended.

Among the extensive list of studies on the energy efficiency, a widely used solution to reduce energy consumption is to put nodes to sleep or turn their radio off while they do not contribute to data delivery. This choice stems from the fact that energy consumption in idle mode is comparable to that in receiving mode and that the duration in idle mode makes up a significant fraction of the node's operational time.

Most notable among the algorithms proposed are the Basic Energy-Conserving Algorithm (BECA), the Adaptive Fidelity Energy-Conserving Algorithm (AFECA), and the Geographical Adaptive Fidelity (GAF). In BECA, the duty cycle (the ratio of idle time to the total operating time) is fixed, while AFECA adaptively decides the sleep period based on the number of neighbor nodes and GAF does this based on the redundant neighbors with the help of the location knowledge from Global Positioning System (GPS).

BECA determines the sojourn times of the nodes such that a node remaining in sleep/idle state can not receive even when there are traffic from other nodes, resulting in deterioration of the network performance.

AFECA adaptively determines the sojourn times depending on the number of adjacent nodes. In order to determine the sojourn times, it is required for the nodes to overhear traffic between the adjacent nodes even when there is no or a little adjacent node(s), resulting in unnecessary power consumption.

In GAF routing protocol, the locations of redundant nodes are discovered with the help of GPS and the sojourn times are determined on the basis of the number of the redundant nodes. However, the GAF is not applicable for sensor networks because of the expensive GPS utilization and much power consumption.

SUMMARY OF THE INVENTION

The present invention has been made in an effort to solve the above and other problems occurring in the prior arts, and it is an objective of the present invention to provide a power-saving method for wireless sensor networks, which is capable of improving the energy efficiency of the sensor node.

It is another objective of the present invention to provide a power-saving method of wireless sensor network which is capable of maximizing the lifetime of the node by allowing the node to decide the transition between the sleep mode and the active mode on the basis of a sleep probability, which adapts to the node density and sleep counter.

The above objectives are achieved with a wireless communication device which can sleep to minimize the energy waste if it does not participate in packet delivery.

In one aspect of the present invention, the power saving method includes initializing a sleep probability upon the device being turned on; operating the active mode for communication; starting an state transition timer at every specific time; operating the sleep mode when there is no packet to transmit or receive before the state transition timer expires; and determining an exit from the current working mode or stay its working mode on the basis of the sleep probability.

BRIEF DESCRIPTION OF THE DRAWINGS

The above and other objectives, features, and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. In the following description of the present invention, a detailed description of known functions and configurations incorporated herein will be omitted when it may obscure the subject matter of the present invention.

The power-saving method of the present invention is adopted to a wireless sensor network with a single physical channel (frequency or code), which is available for all (data and control) message delivery, and there is no separate physical channel for control messages (i.e., in-band signaling). Each node in the system is equipped with an omni-directional antenna, and has only a single transceiver, i.e., nodes cannot send and receive message simultaneously. To address the multiple access problem a four-stage RTS/CTS mechanism with no power control, i.e., the fixed power is used to transmit RTS, CTS, DATA, and ACK messages.

Regarding the routing protocol for route establishment of messages, a reactive (i.e., on-demand route establishment) routing algorithm, such as AODV, is considered due to the following two reasons:

(i) The choice of network protocols and algorithms in wireless sensor networks is widely known to highly depend on target application tasks. In this context, with our target application (phenomenon based sensing task), traffic loads seems to be reasonably low, enabling a reactive routing protocol to be efficient.

(ii) With the energy resource constraint over a low-power sensor network, nodes are required to choose to sleep mode, leading to topology and connectivity changes in the network. Thus, on-demand route establishment seems to be more efficient than a hop-by-hop distance vector routing protocol by periodic broadcasting of route information.

Figure 1:
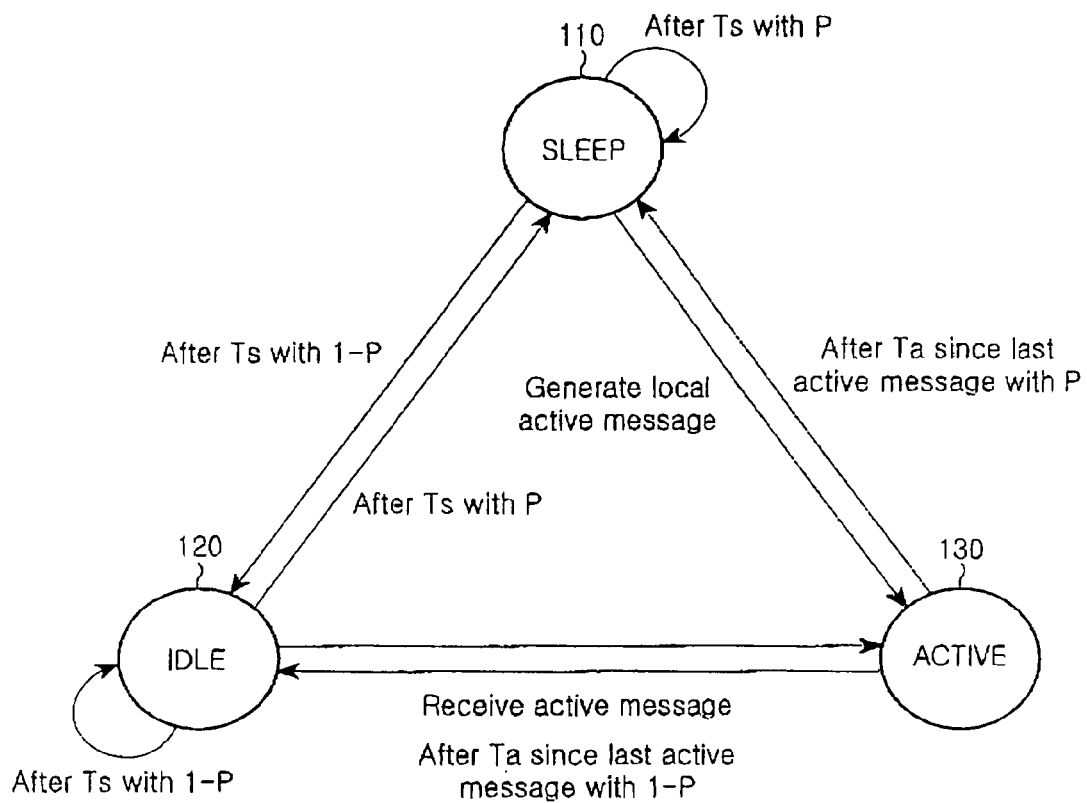
FIG. 1 is a state transition diagram for illustrating a power-saving method according to an embodiment of the present invention.

FIG. 1 is a state transition diagram for illustrating a power-saving method according to an embodiment of the present invention.

Referring to FIG. 1, the power-saving method of the present invention operates based on the transitions of nodes among three states: SLEEP 110 where nodes turn their radios off to save energy, IDLE 120 where nodes are typically ready to receive a message from other nodes, and ACTIVE 130 where nodes actively participates in the transmission or reception of a message.

For example, if a new data which has to be sent to one of neighbor nodes is generated locally at a node, the node makes a transition to the ACTIVE 130 (IDLE→ACTIVE and SLEEP→ACTIVE) in order to initiate RTS/CTS signaling to the destination of the message, Further, the node stays on the ACTIVE state when it waits for a message to continue the on-going signaling (e.g., CTS message after sending an RTS message).

In one embodiment of the present invention, the node waits for the expected message for $T_a$. Unless the node receives the message that it waits for, it makes a transition to the SLEEP state. Analogous interpretation could apply to the case when the node sends a CTS (DATA) message, in which case it has to wait for a DATA (ACK) message. $T_a$ is determined on the basis of the physical characteristic of the deployed wireless sensor network (e.g., channel bandwidth and propagation time of a typical message). For simplicity, the node does not make a transition to the SLEEP state immediately after it receives the ACK message (i.e., it still stays at the ACTIVE state during $T_a$ period, since it joins a route.

After $T_a$ since last "active" message transmission/reception, the node makes at transition from ACTIVE state to either SLEEP state with probability P or IDLE state with probability 1-P, respectively, where P is called sleep probability. The sleep probability should be computed by considering the surrounding traffic volume/pattern and the neighboring node density.

When the node is on the SLEEP state, over every $T_s$ time, it decides on the transition to IDLE state or staying at the SLEEP state with the sleep probability P. $T_s$ is called sleep decision time and should be suitably determined to trade-off sleeping granularity and throughput. Analogous transition from the IDLE state to the SLEEP state could made by the sleep probability P. However, the difference is that on the IDLE state, the node could make a transition to the ACTIVE state, when a message is locally generated or it receives an RTS message.

In computing the sleep probability P, the following factors should be considered:

(i) Adaptivity to the traffic volume in its proximity: All nodes who overhear the exchanges of messages between neighbor nodes, can predict the odds that they can have chance to participate in the packet delivery based upon the resolving contention. Therefore, any node overhearing a lot should increase the sleep probability, since the chance is slim. Furthermore, the network as whole can reduce the contention, if nodes who overhear the traffic exchanges are in sleep state. In other words, this scheme results in reduce contention and increase in throughput as well.

(ii) Adaptivity to the density of neighboring nodes: In a sparse network where nodes are more responsible to deliver messages due to small number of neighbors, nodes have to be more agilely adapt to the network flow. That means, marginal changes in the sleep counter should yield larger changes in the sleep probability. Otherwise, the sleeping can hurt the network connectivity. There, the power saving method of the present invention has to be adaptive to the node density. And, all nodes are assumed to have same hardware, the number of neighbor nodes are the same meaning as the node density.

In the present invention, the sleep counter which represents the traffic volume in its proximity is employed, and the nodes have an estimate about the number of neighboring nodes by overhearing messages. Using these two inputs, it is possible to suitably design the sleep probability update function to compute the sleep probability.

The basic idea in maintaining the sleep counter is that as a node overhears more messages (which are not intended for it), it increases the sleep counter. Whereas, at node participates in active message delivery (e.g., it sends/receives both control and data messages) it decreases the sleep counter.

Thus, the sleep counter may increase or decrease only if the node is either in the IDLE state or the ACTIVE state. In particular, in the ACTIVE state, it only decreases the sleep counter. However, when the node is in the IDLE state, it increases the sleep counter proportionally to the number of overhearing message. Further, there are no active message in the IDLE state or the SLEEP state during $T_s$ time, it simply increases the sleep counter.

Figure 2:
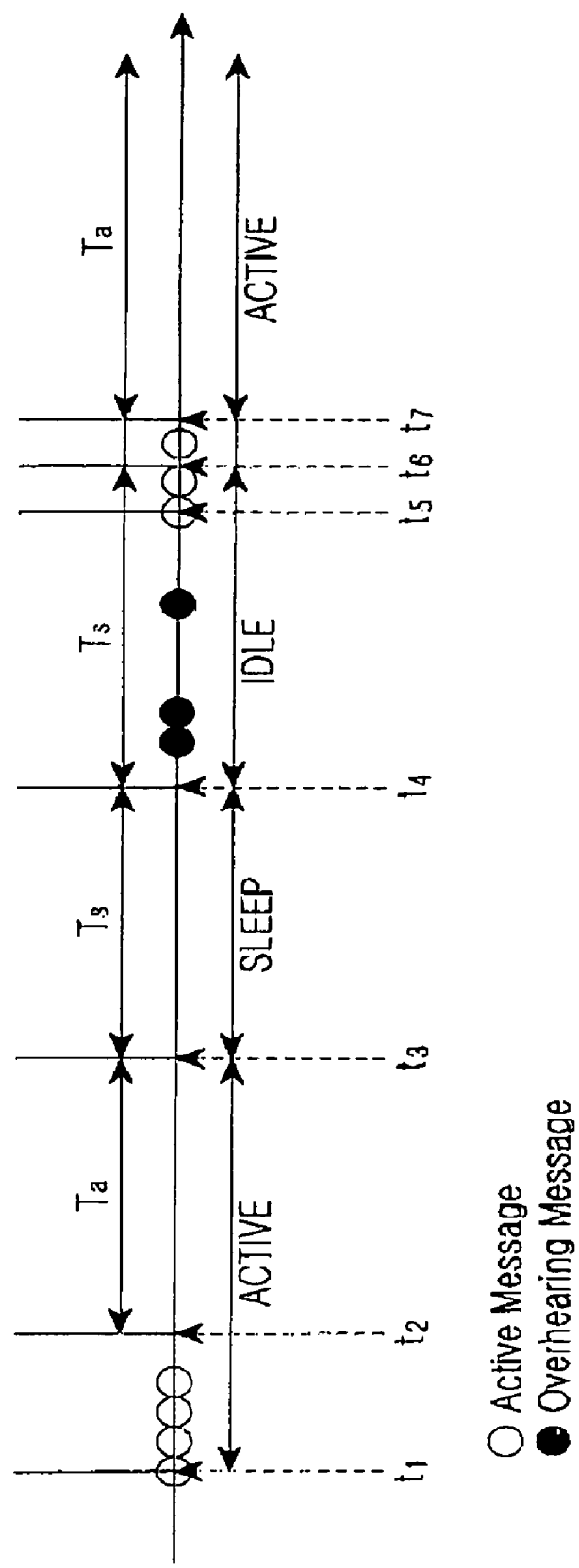
FIG. 2 is all exemplary view illustrating state transitions of a node at time domain.

FIG. 2 is an exemplary view illustrating state transitions of a node at time domain.

During the active message exchange, the node stays on the ACTIVE state and waits for $T_a$ after the last active message is sent/received. The node makes a transit to the SLEEP state with the probability P and to the IDLE state with the probability 1-P at time $t_3$.

Also, the node on the SLEEP state transits to the IDLE state with probability 1-P and remains in the SLEEP state with the probability P at time $t_4$. If an active message is generated in the SLEEP state, the node transits to the ACTIVE state, immediately.

In the IDLE state, the node overhears the messages and then transits to the SLEEP state with probability P and remains in the IDLE state with the probability 1-P, at time $t_6$ if there is no active message to be transmitted or received during the sojourn time $T_s$. In the meantime, if active messages to be transmitted or received are generated before the sojourn time $T_s$, the node transits to the ACTIVE state at time $t_5$.

The sleep counter (maintained by each node) is updated by the following three kinds of sleep counter update events:
 (i) active receive/send event,
 (ii) overhearing event, and
 (iii) periodic inactive event.

First, an active receive/send event corresponds to the case when a node sends or receives both control and data messages. In this case, a node decreases the sleep counter. As described above, this event implies that a node participates in the packet delivery. Second, an overhearing event is generated by a node's listening control or data messages, which is not intended for the node. In this case, a node increases the sleep counter. Third, a periodic event is generated when there are no active or overhearing message around the node. In this case, a node increase the sleep counter. The power saving method of the present invention uses all kinds of control and data messages to update the sleep counters for active receive/send events and overhearing events. This is because all messages indirectly implies the network conditions and traffic volumes around the corresponding node.

To compute the sleep probability of a node, the two parameters, i.e., a sleep counter and a node density around the node, are used.

The node density is represented by a number of neighboring nodes. It is clear that the sleep probability should be an increasing function with respect to the sleep counter. The sleep counter and node density intuitively correspond to the traffic volume (i.e., congestion level) around the node and the degree of sensitivity to which the node adjusts the sleep probability, respectively.

In order to compute the sleep probability of the node v, a sleep probability update function $\omega: Z \times Z_+ \mapsto |[\underline{P}, \overline{P}]|$ is introduced, where $0 < \underline{P} < \overline{P} < 1$. Thus, the sleep probability of the node v at time t is expressed as follows.

$$P_v = y(c_v, v_v),$$

where $v_v$ is the number of nodes in the proximity of the node v and $c_v$ is the sleep counter of the node v. This sleep probability is only updated when an event (to change the sleep counter or the node density) is generated.

With respect to two parameters, the required properties of y are the following:

Requirement 3.1; For a fixed $0 ? v_v$, $$\frac{y}{c_v} > 0. \quad (i)$$

$$\frac{y}{c_v} \frac{1}{v_v} \quad (ii)$$

$$\lim_{c_v ?} y(c_v, v_v) = \overline{P} \text{ and } \lim_{c_v ?} y(c_v, v_v) = \underline{P}. \quad (iii)$$

The requirement (i) says that the sleep probability function is all increasing function with respect to the sleep counter for a fixed positive, finite node density. Further, its increasing rate is inversely proportional to the node density, as described in (ii). This requirement deals with the sensitivity of sleep duration of the node v to the local node density.

As described above, in the sparse network where nodes are more responsible to deliver messages due to small number of neighbors, nodes have to be more agilely adapt to the network flow. That means, marginal changes in the sleep counter should yield larger changes in the sleep probability. Otherwise, the sleeping can hurt the network connectivity. This intuition lets the change ratio of sleep update function be proportional to the inverse of node density. The requirement (iii) simply states that the sleep probability should be upper and lower bounded by some number.

The sleep probability update function of this embodiment is as follows.

$$P_v = y(c_v, v_v) = \begin{array}{l} d\left(1 - e^{\frac{c_v}{v_v}}\right) + P_i \text{ if } c_v \; 0 \\ d\left(e^{\frac{c_v}{v_v}} - 1\right) + P_i \text{ if } c_v < 0, \end{array} \quad (2)$$

where $d = (\overline{P} - \underline{P})/2$, and $p = (\overline{P} + \underline{P})/2$.

In this embodiment, an exponential type of sleep probability update function is used for simplicity. However, there could be many other types of functions.

It is noted that the update function (2) satisfies the Requirement 3.1.

The choice of $\overline{P}$ and $\underline{P}$ depends on the target application tasks and data rate to which sensing information is generated. Typically, prior to scattering sensors, the target area and the number of sensors are pre-determined. With these given information, by assuming that sensors are randomly placed in the monitoring area, the system operator could know the sensor density. Then, $\overline{P}$ and $\underline{P}$ can be chosen by the required mean number of wake-up nodes to sustain the given throughput constraint. $P_i$ corresponds to the initial sleep probability (i.e., when $c_v = 0$, and we design the sleep probability function, such that $P_i$ is the median value of upper and lower bound for simplicity.

Figure 3:
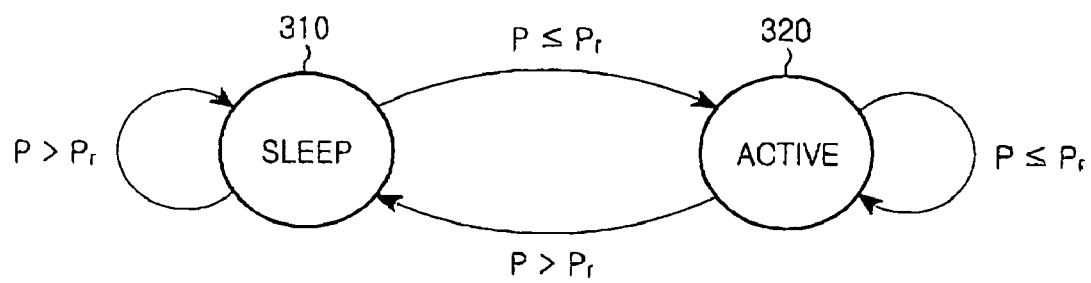
FIG. 3 is a state transition diagram for illustrating a power-saving method according to another embodiment of the present invention.

FIG. 3 is a state transition diagram for illustrating a power-saving method according to another embodiment of the present invention.

As shown in FIG. 3, the node operates in two power control modes, i.e., SLEEP and ACTIVE modes 310 and 320.

Each node has sleep and active timers $T_s$ and $T_a$ and a SLEEP probability P. P increases whenever traffic is overheard and decreases whenever an active message to be transmitted or received is detected. If there is no overheard traffic or active messages to be transmitted/received during the state sojourn period T, P decreases. The sleep probability P varies in the ACTIVE mode but not in the SLEEP mode.

In the power-saving method according to this embodiment, the node changes or maintains the present state every T according to the sleep probability P. The node generates an uniformly distributed random value $P_r$ between 0 and 1 and compares the random value with the sleep probability P.

In SLEEP mode, the node maintains SLEEP mode if P is greater than $P_r$ and make a transit to the ACTIVE mode if P is less than or equal to $P_r$. In ACTIVE state, the node transits to the SLEEP mode if P is greater than $P_r$ and maintains ACTIVE mode if P is less than or equal to $P_r$.

Figure 4:
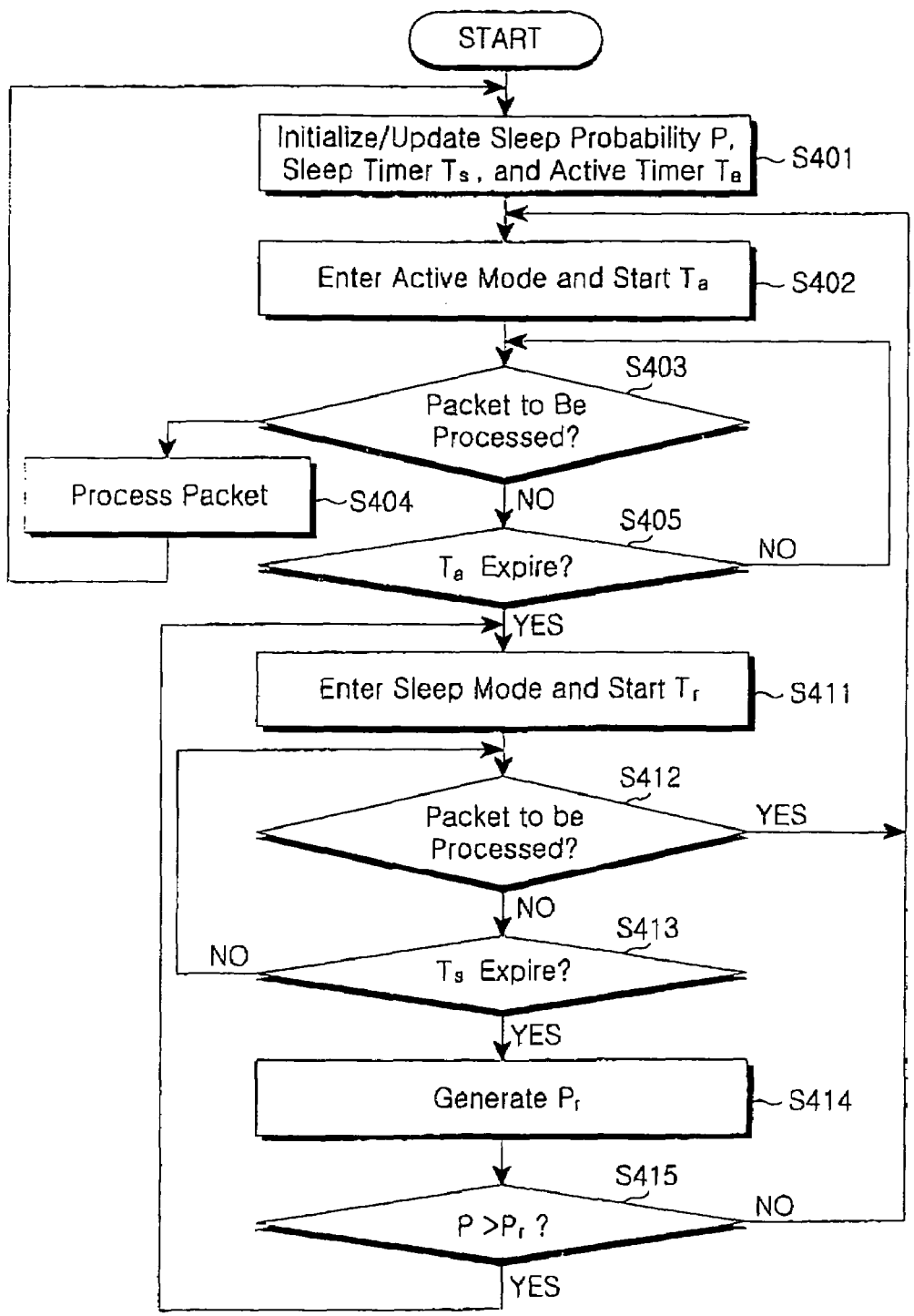
FIG. 4 is a flowchart illustrating a power-saving method according to one embodiment of the present invention.

FIG. 4 is a flowchart illustrating a power-saving method according to one embodiment of the present invention.

Referring to FIG. 4, once a node is deployed, the node initialize the sleep probability P, sleep timer $T_s$, and active timer $T_a$ at step S401. After initializing the parameters, the node enters active mode and starts the sleep timer $T_s$ at step S402, and determines whether or not there is any packet to be processed at step S403. If there is the packet to be processed, the node processes to transmit or receive the packet at step S404 and then goes to step S401 to update the parameters. On the other hand, if there is no packet to process, the node determines whether or not $T_a$ is expired at step S405.

If $T_a$ is expired, the node enters make a transit to the sleep mode and starts $T_s$ at step S411, and then determines whether or not there is any packet to be processed at step S412. If there is a packet to be processed, the node make a transit to the active node at step S402. Otherwise, the node determines whether or not $T_s$ is expired at step S413. If $T_s$ is expired, the node generates random value $P_r$, which is uniformly distributed value between 0 and 1, at step S414 and determines whether or not P is greater than $P_r$ at step S415. If P is greater than $P_r$, the node maintains the sleep mode so as to go to the step S411. Otherwise, the node make a transit to the active mode so as to go to the step S402.

Figure 5:
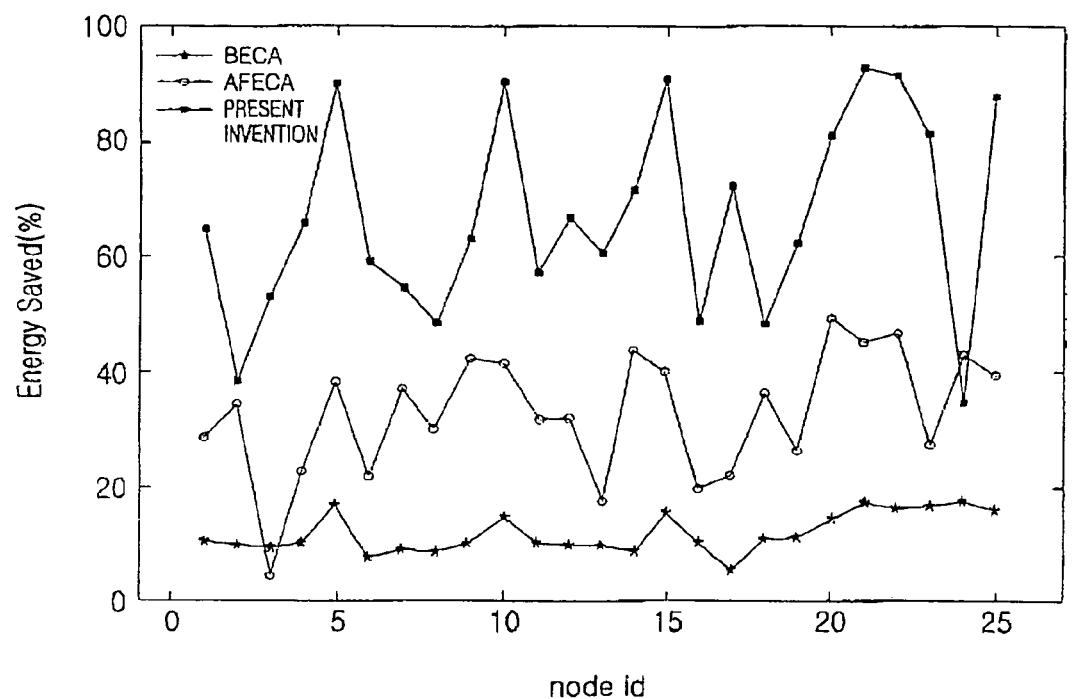
FIG. 5 is a graph illustrating energy efficiency of the power saving methods of the present invention and conventional power saving techniques.
Figure 6:
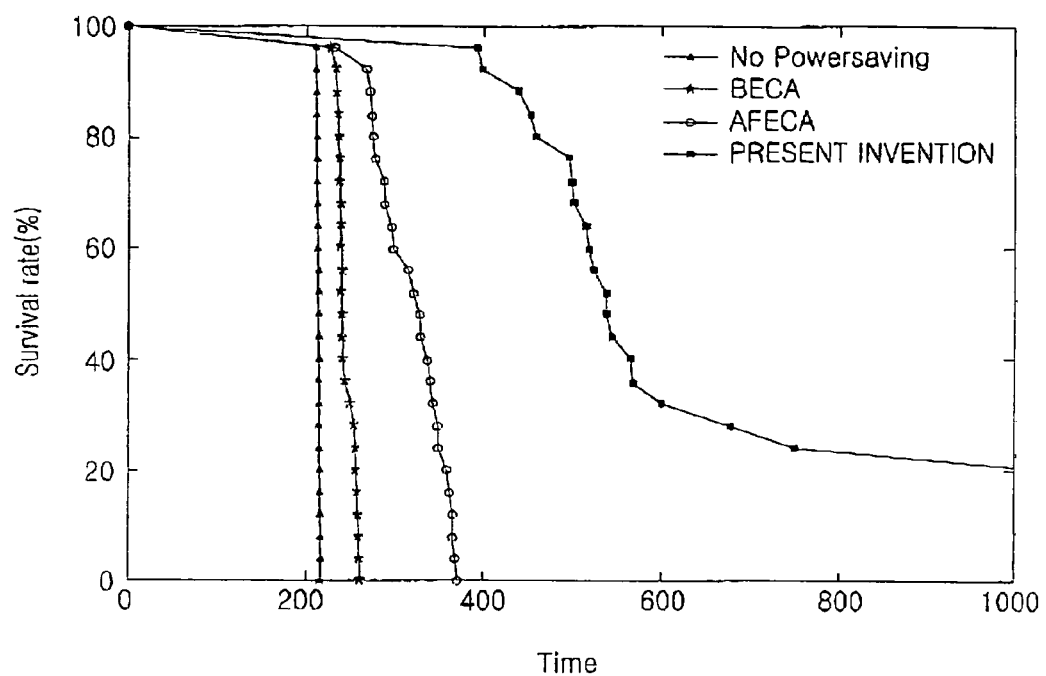
FIG. 6 is a graph showing the survival rate curves of the whole networks with the power saving methods of the present invention and the conventional arts, respectively.
Figure 7:
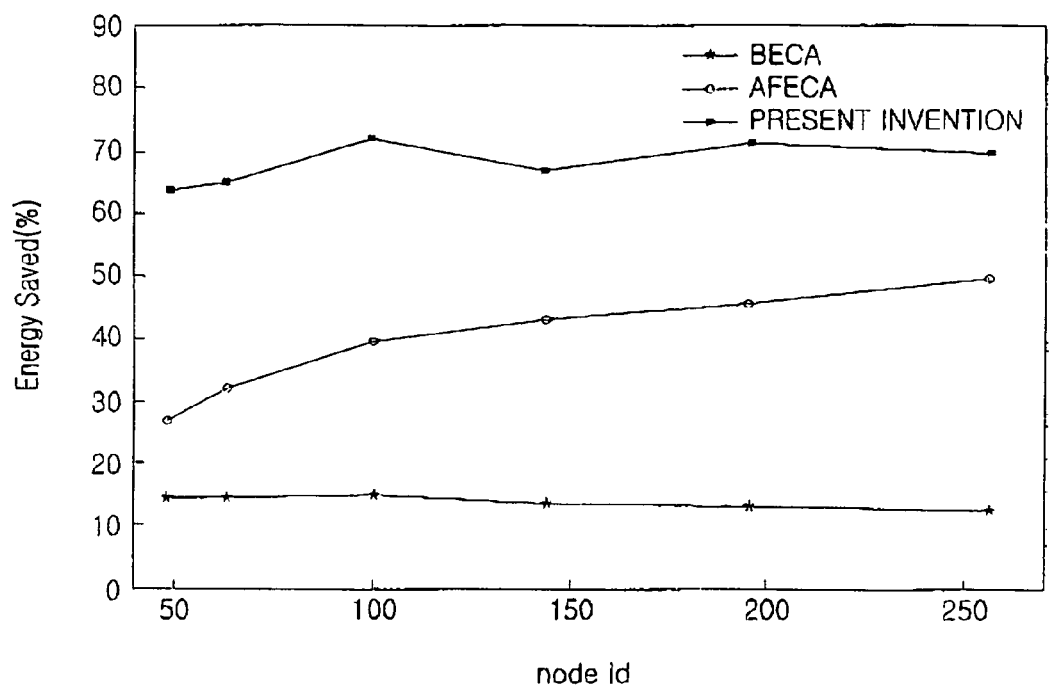
FIG. 7 is a graph showing average saved energy curves according to the changes of the network density.

FIGS. 5 to 7 are graphs illustrating simulation results of the power saving methods according to the present invention and conventional airs.

For the simulation, 100 static wireless sensor nodes were uniformly distributed in an area, a sink node is located at one side of the network, and a $CO_2$ phenomenon node wonders in the network and injects the sensing phenomenon into the network every 0.5 seconds. The parameters listed in table 1 are used for various simulations.

All the simulation is run for 100 seconds to compare energy efficiency and for 1000 seconds to compare node's survival rate. For the power saving method of the present invention, $T_a$=50 sec. and $T_s$=1.0 sec. for all the simulations.

TABLE I

SIMULATION PARAMETERS

| Parameters | | Values |
| --- | --- | --- |
| Network | Ad hoc Routing | AODV |
|  | Network size | 451 × 451 $m^2$ |
|  | # of sensor nodes | 26 (static) |
|  | MAC | IEEE 802.11 |
|  | Transportation | UDP |
| Radio | Antenna | Omnidirectional |
|  | Propagation | Two ray ground |
|  | Capture Threshold | 1.559 × $10^{-11}$ W |
|  | Receiving Threshold | 3.652 × $10^{-10}$ W |
|  | Bandwidth | 2 Mbps |
|  | TX Power | 0.282 W |
|  | Maximum TX Range | 250 m |
|  | Carrier Frequency | 914 MHz |
| Energy | Initial Energy | 200.0 J |
|  | TX Power | 1.425 W |
|  | RX Power | 0.925 W |
|  | Idle Power | 0.925 W |
|  | Sleep Power | 0.001 W |
|  | Sensing Power | 0.001 W |

FIG. 5 is a graph illustrating energy efficiency of the power saving methods of the present invention and conventional power saving techniques.

As shown in FIG. 5, most nodes can achieve higher than 50% of energy efficiency. The power saving method of the present invention achieves around 71.5% of average energy efficiency. It is much higher than those of BECA and AFFECA, 14.1% and 38.5%, respectively.

FIG. 6 is a graph showing the survival rate curves of the whole networks with the power saving methods of the present invention and the conventional arts, respectively.

As shown in FIG. 6, without power saving mechanism, all nodes die around 213 seconds suddenly. In BECA, nodes start to die at 237 seconds and all stop working at 262 seconds. AFECA works better than BECA, start to stop working at 285 seconds and all stop at 456 seconds. The power saving method of the present invention outperforms the competitors such that the nodes start to stop at 340 seconds and about 15% of the nodes ire stilling working even at 1000 seconds.

FIG. 7 is a graph showing average saved energy curves according to the changes of the network density.

As shown in FIG. 7, the AFECA, which controls the sleeping time according to the number of neighbor nodes, performs worse in the sparser network but increases the saving rate as the network density increase, while the BECA saves energy rather independent of the network density. Rather slow increase in the energy efficiency is observed in the power saving method of the present invention.

As described above, the power saving method of the present invention allows all wireless sensor nodes in the network to adaptively switch their working modes on the basis of a sleep probability which is updated with the changes of traffic volume and node density in the proximity of the node, thereby it is possible to enhance the energy efficiency.

Also, due to the enhancement of the energy efficiency, the power saving method of the present invention extends the lifetimes of the every nodes and eventually accomplish the longevity of the whole network.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of saving battery power in a wireless communication, the method comprising:

initializing a sleep probability upon the device initially being deployed, such that the sleep probability is calculated based on a number of neighboring wireless communication devices and a sleep counter which is updated during each of an active event, an overhearing event, and a periodic inactive event;

operating an active mode to perform the communication;

starting an active mode timer;

operating a sleep mode when there is no packet to transmit or receive before the active mode timer expires;

overhearing packets addressed to the neighboring wireless communication devices during the sleep mode;

updating the sleep probability depending on a number of the overheard packets addressed to the neighboring wireless communication devices; and determining an exit from the sleep mode on the basis of the updated sleep probability.

2. The method of claim 1, wherein the operating of the active mode comprises:

determining whether a packet is to be transmitted or received before the active mode timer expires;

processing the packet if there is the packet to transmit or receive; and decreasing the sleep probability in proportion with a number of packets processed.

3. The method of claim 2, wherein the step of operating the active mode further comprises:

generating a random value if the active mode timer is expired;

determining whether or not the sleep probability is greater than the random value;

transiting to the sleep mode, if the sleep probability is greater than the random value; and maintaining the active mode, if the sleep probability is not greater than the random value.

4. The method of claim 3, wherein the step of operating the sleep mode comprises:

starting a sleep mode timer:

determining whether or not there is a packet to be processed;

transiting to the active mode if there is the packet to be processed;

determining whether or not the sleep mode timer is expired if there is no packet to be processed;

generating a random value if the sleep mode timer is expired;

determining whether or not the sleep probability is greater than the random value;

maintaining the sleep mode if the sleep probability is greater than the random value; and transiting to the active mode if the sleep probability is not greater than the random value.

5. The method of claim 2, wherein the sleep probability is calculated by equation:

$$P_v = y(c_v, v_v) = \begin{cases} d\left(1 - e^{\frac{c_v}{v_v}}\right) + P_i & \text{if } c_v \geq 0 \\ d\left(e^{\frac{c_v}{v_v}} - 1\right) + P_i & \text{if } c_v < 0, \end{cases}$$

where $P_v$ is the sleep probability of node v, $v_v$ is a number of nodes in the proximity of the node v, $c_v$ is a sleep counter of the node v.

6. The method of claim 1, wherein the step of operating the sleep mode comprises:

starting a sleep mode timer;

determining whether or not there is a packet to be processed;

transiting to the active mode if there is the packet to be processed;

determining whether or not the sleep mode timer is expired if there is no packet to be processed;

generating a random value if the sleep mode timer is expired;

determining whether or not the sleep probability is greater than the random value;

maintaining the sleep mode if the sleep probability is greater than the random value; and transiting to the active mode if the sleep probability is not greater than the random value.

7. The method of claim 6, wherein the random value is a uniformly distributed random value selected between 0 and 1.

8. The method of claim 1, wherein the number of neighboring wireless communication devices are estimated by overhearing packets addressed to other devices in a proximity of the device, and the sleep counter represents a traffic volume in the proximity of the device.

9. The method of claim 1, wherein the sleep probability is increased in proportion with the number of the overheard packets addressed to the neighboring wireless communication devices.

10. The method of claim 1, wherein the sleep counter is increased during the active event, and is decreased during the overhearing event and the periodic inactive event, the active event being generated when the device sends and receives both a control and data message, the overhearing event being generated when the device listens the control or data message, and the periodic inactive event being generated when no active or overhearing message around the device.

11. A method of saving battery power of a node in a wireless communication network, the method comprising:

initializing a sleep counter to a predetermined number;

initializing an active timer to a predetermined time;

initializing an active mode corresponding to the node to communicate with at least one other node, and activating the active timer;

updating the sleep counter when communication between the node and the at least one other node occurs, during an overhearing event, or a periodic inactive event;

switching the node to a sleep mode when there is no communication between the node and the at least one other node before the active mode timer expires;

overhearing packets addressed to the at least one other node during the sleep mode;

updating the sleep counter depending on a number of the overheard packets;

calculating a sleep probability based on a number of neighboring nodes and the updated sleep counter; and exiting from the sleep mode on the basis of the sleep probability.

12. The method of claim 11, further comprising:

comparing the sleep probability to a predetermined number; and exiting the sleep mode based on the comparison.

13. The method of claim 12, wherein the predetermined number is a uniformly distributed random value selected between 0 and 1.

14. The method of claim 11, wherein the updating of the sleep counter comprises:

decreasing the sleep counter each time there is communication between the node and the at least one other node;

increasing the sleep counter during the overhearing event or the periodic inactive event; and re-calculating the sleep probability based on the decreased or increased sleep counter.

15. The method of claim 11, wherein:

the increasing rate of the sleep probability is inversely proportional to the number of neighboring nodes; and the increasing rate of the sleep probability is directly proportional to the sleep counter.

16. The method of claim 11, wherein the number of the neighboring nodes are estimated by overhearing packets addressed to other devices in a proximity of the node, and the sleep counter represents a traffic volume in the proximity of the node.

17. The method of claim 11, wherein the sleep probability is increased in proportion with the number of the overheard packets.

18. The method of claim 11, wherein the sleep counter is increased during the active event, and is decreased during the overhearing event and the periodic inactive event, the active event being generated when the node sends and receives both a control and data message, the overhearing event being generated when the node listens the control or data message, and the periodic inactive event being generated when no active or overhearing message around the node.

19. A method of saving battery power of a wireless communication device by initiating a sleep mode to minimize power consumption where the device is not in an active mode to perform communication, the method comprising:

initializing a sleep probability upon the device initially being deployed;

operating the active mode to perform the communication;

starting an active mode timer;

determining whether a packet is to be processed before the active mode timer expires;

processing the packet if there is the packet to transmit or receive;

overhearing packets addressing other devices in a proximity of the device; and updating the sleep probability on the basis of numbers of packets processed and overheard, respectively;

operating the sleep mode when there is no packet to transmit or receive before the active mode timer expires; and determining an exit from the sleep mode on the basis of the sleep probability, wherein the sleep probability is calculated by equation:

$$P_v = y(c_v, v_v) = \begin{cases} d\left(1 - e^{\frac{c_v}{v_v}}\right) + P_i \text{ if } c_v \ 0 \\ d\left(e^{\frac{c_v}{v_v}} - 1\right) + P_i \text{ if } c_v < 0, \end{cases}$$

where $P_v$ is the sleep probability of node $v$, $v_v$ is a number of nodes in the proximity of the node $v$, $c_v$ is a sleep counter of the node $v$.

* * * * *